Feb. 1, 1955 M. P. WINTHER 2,701,315
ELECTROMAGNETIC CLUTCH
Filed July 13, 1953 2 Sheets-Sheet 1

Martin P. Winther
Inventor
Koenig and Pope
Attorneys

Feb. 1, 1955 — M. P. WINTHER — 2,701,315
ELECTROMAGNETIC CLUTCH
Filed July 13, 1953 — 2 Sheets-Sheet 2

Martin P. Winther
Inventor
Koenig and Pope
Attorneys

United States Patent Office 2,701,315
Patented Feb. 1, 1955

2,701,315

ELECTROMAGNETIC CLUTCH

Martin P. Winther, Gates Mills, Ohio, assignor to Eaton Manufacturing Company, Cleveland, Ohio, a corporation of Ohio Application July 13, 1953, Serial No. 367,459

9 Claims. (Cl. 310—105)

This invention relates to electromagnetic clutches, and with regard to certain more specific features, to clutches of the slip type useful as couplings, brakes and the like.

Among the several objects of the invention may be noted the provision of a low-cost, compact, high-capacity electromagnetic clutch having a low-inertia inductor member adapted to be efficiently cooled; the provision of a clutch of the class described having a field member incorporating a pole arrangement productive of short perpendicular paths through the inductor of high-intensity magnetic flux with a minimum of flux leakage; and the provision of a clutch of the class described having short, low-resistance eddy-current paths in the inductor. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is an axial section taken through the lower half of a clutch embodying the invention;

Corresponding reference characters indicate corresponding parts throughout the several views of the drawings.

Figure 1:
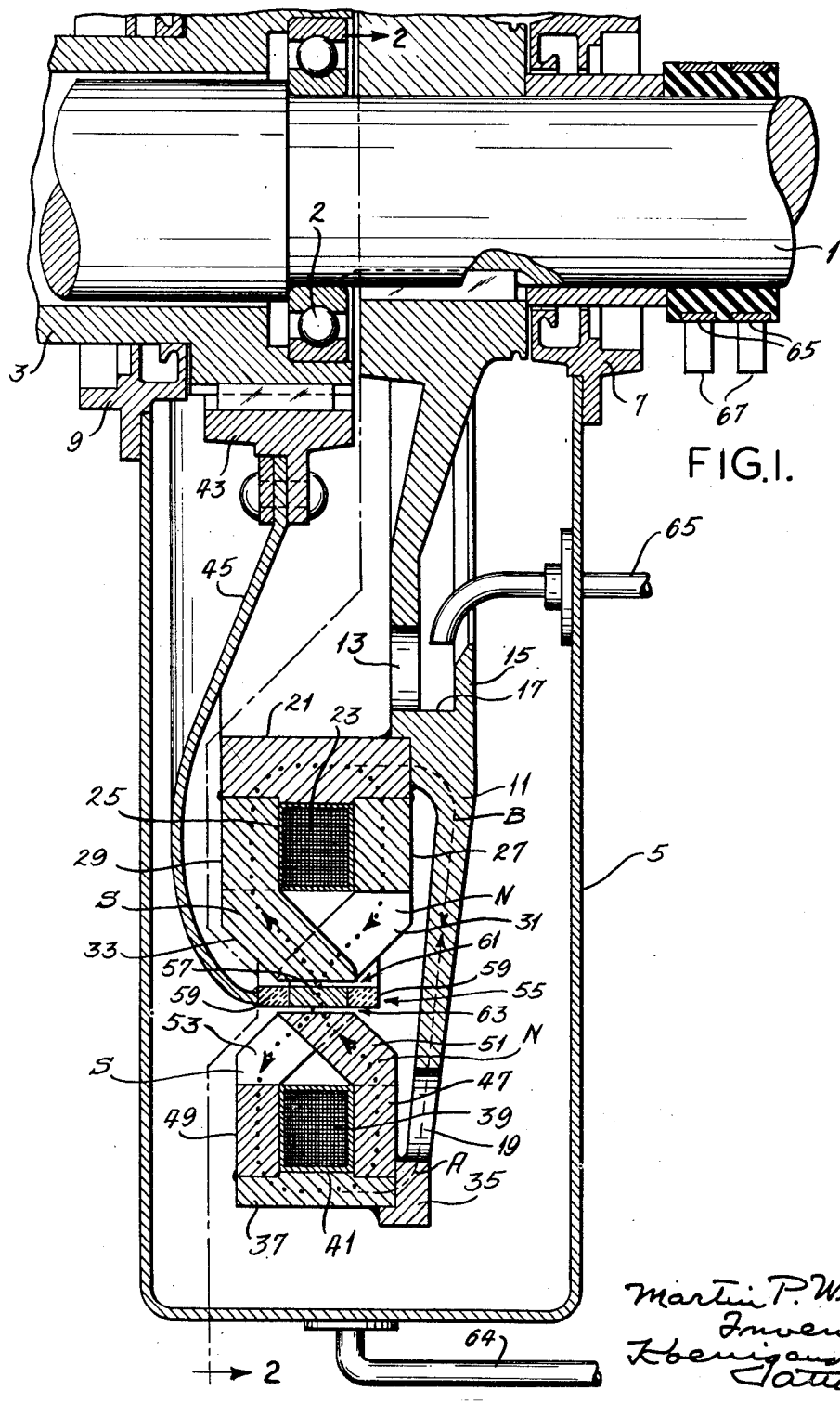

Electromagnetic clutches are used for a variety of purposes, such as forming couplings and brakes in various devices, power shovels being an example. The driven member in the case of power shovels is sometimes held stationary and does not revolve for some period of time during the cycle of a digging operation, as, for example, when the shovel becomes stuck in a bank. The driven member may then be stalled for a substantial period during which it may generate a considerable amount of heat, requiring cooling. Under the existing operating conditions, cooling fans as at present used become clogged with dirt and must be cleaned at frequent intervals, and when so clogged the heat not dissipated tends to destroy the structure. Moreover, clutches in applications such as mentioned must have a high capacity and consequently tend to become excessively large.

Briefly, the invention consists in driving and driven members of which one member (preferably the driven member) is constituted by a comparatively thin drum of magnetic (iron) material. This drum preferably has copper end rings and is carried on a driven member of thin cross section which, besides forming a drive connection, also functions as a guide for determining a circulating path for coolant to be applied to the drum. The oher member (preferably the driving member) is a field member having annular excitation coils respectively located outside and inside of the drum, each coil being enveloped by an annular magnetic member providing adjacent pole rings having sets of interdigitated poles between the coil and the drum, of the general nature set forth in the U. S. Patent 2,606,948 of Ralph L. Jaeschke, dated August 12, 1952. The poles of the rings are so polarized and grouped as to form a unique interlacing flux path for driving high concentrations of flux through the inductor ring without incurring any substantial flux leakage between poles, even though two of the pole rings may be mounted upon common magnetic supports to one side or another of the coils. Provision is made for the introduction of coolant (oil) within the supporting member for the pole rings, the coolant being circulated by centrifugal force and guided by the containing effect of said driven member, so as to circulate it over the inductor drum. This abstracts heat caused by the eddy currents which will flow under any relative movement between the driving and driven members.

In the example described below, although the field member is described as the driving member and the inductor drum as the driven member, and this arrangement is preferable for best results in connection with oil circulation, it will be understood that the role of these members may be reversed in certain applications.

Referring now more particularly to the drawings, there is shown at numeral 1 a drive shaft and at 3 a driven quill. Between them is a pilot bearing 2. At 5 is shown a liquid-tight casing, sealed with respect to the shaft 1 and quill 3, as indicated by running seals 7 and 9, respectively. Keyed to the shaft 1 is a supporting spider or disc 11 in which is an inner group of openings 13. Adjacent openings 13 is a flange 15 forming an oil-distribution groove 17. A group of outer openings is shown at 19.

Outside of the inner group of openings 13, the spider 11 is grooved to receive and have welded thereto an inner magnetic (for example, iron) ring 21 which carries an inner annular field coil 23 contained in a nonmagnetic (for example, copper) liquid-proof casing 25. The coil 23 is flanked by magnetic (for example, iron) pole rings 27 and 29 which are welded to the inner ring 21. Pole ring 27 carries a ring of inwardly angled poles 31 which peripherally interdigitate with a ring of inwardly angled poles 33, the latter extending from the pole ring 29. For further details of such an interdigitated pole structure per se see said Patent 2,606,948.

The spider 11 is also grooved in its rim 35 to receive a second magnetic ring 37. Carried within this ring is a second annular field coil 39, contained in a nonmagnetic (for example, copper) liquid-proof casing 41. The coil 39 is flanked by magnetic (for example, iron) pole rings 47 and 49 which are welded to the outer ring 37. Pole ring 47 carries a ring of inwardly angled poles 51 which peripherally interdigitate with a ring of inwardly angled poles 53. The latter extend from the pole ring 49. The characteristic shape and interdigitation of the poles 51 and 53 is similar to that of poles 31 and 33, except that the former extend inward while the latter extend outward.

Keyed to the quill 3 is a hub 43 to which is riveted a solid, preferably stamped, cup-shaped disc 45. This disc is contoured for close organization with the inner field parts, as shown. The periphery of this disc is welded to an inductor drum indicated generally by the numeral 55. Specifically, the drum consists of a magnetic (for example, iron) central portion 57, to the opposite ends of which are welded highly conductive (for example, copper) end rings 59. It is to one of these rings 59 that the margin of the disc 45 is welded, as indicated. The power transmitting spider or disc 11 and disc 45, with the inductor drum 55 form a compartment for coolant, as will appear.

Figure 3:
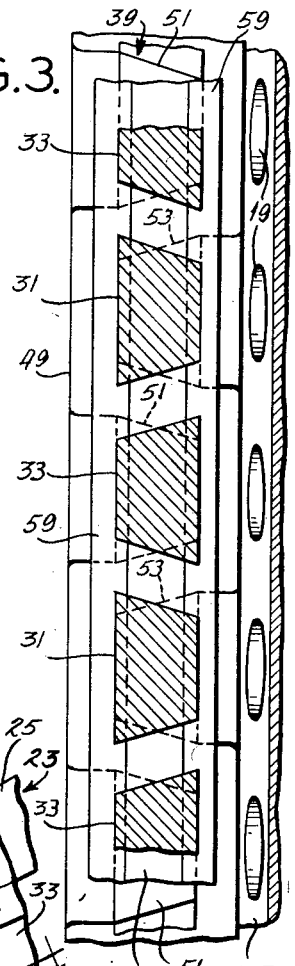
Fig. 3 is a diagrammatic view taken on line 3—3 of Fig. 2, showing the peripheral relationships of certain pole ends.

The inner faces of the poles 51 and 53, and the outer faces of the poles 31 and 33, are circularly ranked, as indicated in Fig. 3, and are radially spaced a distance somewhat greater than the thickness of the inductor drum 55. This provides inner and outer small clearances or gaps 61 and 63, respectively, between the poles and the inductor drum 55. The length of the magnetic portion 57 of the drum is such that this magnetic portion will face the pole ends while the copper end rings 59 lie essentially outside of these faces.

Figure 2:
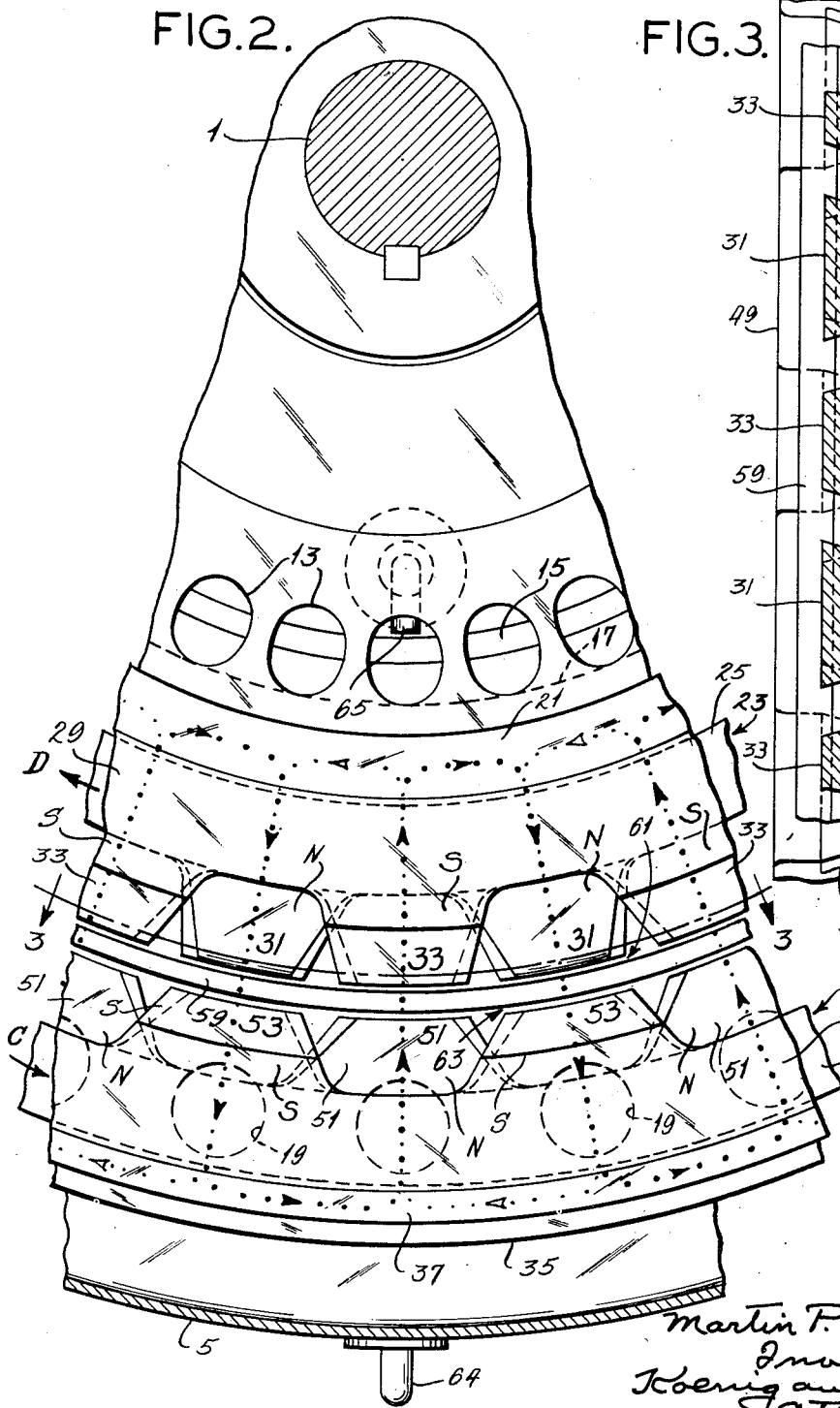
Fig. 2 is a fragmentary cross section taken on line 2—2 of Fig. 1.

Peripherally considered, poles 33 are opposite and in the same axial planes, respectively, as poles 51, and the same is true of poles 53 and 31 (see Figs. 2 and 3). On the other hand, poles 51 and 31 lie on the same side of a mean plane through the coils 39 and 23, and the poles 53 and 29 lie on the other side of this plane (see Fig. 1). Suitable wiring (not shown) is mounted on the member 11 and connects the coils 23 and 39 with collector rings 65 and brushes 67. The brushes are fed from an outside D. C. circuit having any suitable rheostat or other control for controlling the flow of current through the coils 23 and 39 by means of which the excitation of these coils may be varied. The circuit is such that current flows clockwise in one coil and anti-clockwise in the other (see, for example, darts C and D in Fig. 2). This results in poles 51 and 31 having the same polarity (north, for example) and poles 53 and 33 having the opposite polarity (south, for example). These polarities are indicated on the poles in the drawings.

Thus when the coils are energized, a magnetic circuit is established such as illustrated, for example, by the dotted lines in Figs. 1 and 2, the arrowheads indicating the magnetic loops, which in cross section (Fig. 1) is the shape of a figure eight. Peripheral distribution of the magnetic field is as shown by dotted lines and arrow heads. Thus the magnetic field proceeds from, say, north pole 51 through drum 55 to an opposite south pole 33, then around coil 23, proceeding out of a north pole 31 through drum 55 into a south pole 53, and thence around coil 39 to close the figure eight loop. It is to be noted that the passage of flux from a north pole 51 to a south pole 33 is at a peripheral point in the drum 55, which is spaced from the peripheral point at which flux passes from a north pole 31 to a south pole 53. The degree of magnetic coupling between the driving and driven members is controlled by control of the exciting current flowing in coils 23 and 39, since the ampere turns of these coils control the intensity of the magnetic flux. This in turn controls the degree of torque magnetically transmitted. For a given degree of torque transmitted, the amount of rotary slip between the driving and driven members decreases with increased excitation.

It is to be noted from Fig. 2 that any tendency for cross leakage of flux between adjacent poles 51 and 53, on the one hand, or 31 and 33 on the other hand, through the drum 55 is discouraged because of the already magnetized condition of the drum from opposite poles 51, 33 or 53, 31. Thus the preponderating part of the available flux is driven straight through the drum 55 normal to its surface at the adjacent gaps in the figure eight pattern suggested in Fig. 1. It is such normally directed flux that has the maximum effect in engendering eddy currents in the drum 55 in such a direction as to provide maximum magnetic flux reaction with the flux from the poles, which (as is known) is responsible for the magnetic coupling effect between the driving and driven members. Because of the arrangement of parts above described, the axes of almost all of the eddy-current loops are normal to the axis of the drum 55. This also places the copper end rings 59 in most of the loops and these rings reduce the resistance to them. Very few eddy currents circulate in random useless directions.

Another important feature of the construction is that two (for example, north) poles 51 and 31 on one side of the coils 23 and 39 discourage the flow of any leakage flux through the spider 11 which joins the pole rings 47 and 27. This is because of the bucking action of leakage potential illustrated by the oppositely directed dash-line arrows A and B in Fig. 1. The same action discourages flux leakage through the air between poles 51 and 31 or between poles 53 and 33.

Another advantage of the invention is that the radial path of flux through the drum is small, as are also the lengths of the eddy-current paths in the drum. The net result is production of high flux concentrations in the drum 55, without correspondingly large current excitations of the coils 23 and 39.

Under stalled conditions of the driven member 3, with the coils 23 and 39 excited, the inductor drum 55 may be considerably heated by the eddy currents generated therein, and, unless cooled, its temperature might rise to damaging values. In order to prevent this, a coolant such as oil is introduced under pressure into a pipe 65 and projected into the inwardly open collector groove 17, whence it will flow through openings 13 and 19. The flow is in one direction axially through the cup formed by the inside ring 21. It then moves by centrifugal force, being guided by the disc member 45 through the gap 61 and past poles 31 and 33, and also around the open (left) end of the drum 55. In this case the drum 55 acts as a cup and flow is in the opposite axial direction. From this point the oil may flow partly out through the openings 19 and some may circulate around the poles 51 and 53, as shown. The oil may be abstracted through a suitable conduit 64 connected to the bottom of the housing 5 for return to the sump from which is obtained the oil for pipe 65. It will be noted that centrifugal force and the guiding character of the disc member 45 ensure the proper radial circulation of the oil to and through the drum 55. The sheaths 25 and 41 protect the coils 23 and 39 from the oil.

In view of the above, it will be seen that, due to the arrangement of the poles of the machine for maximum magnetic excitation of the drum 55 with minimum electric excitation of the coils 23 and 39 and the cooling arrangement described, the clutch has a relatively high torque capacity for a relatively small size and weight, particularly with regard to the drum 55 on the driven member. This drum also has a low moment of inertia, which is desirable in many applications, such as operation of power shovels, as above mentioned.

Since brakes and the like are special forms of a slip clutch and the invention is applicable to brakes, the term clutch as used in the claims includes clutches, brakes and the like.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An electromagnetic clutch comprising driving and driven members, one of said members comprising a magnetic drum, the other member comprising annular field coils respectively located on the outside and the inside of said drum, pairs of magnetic pole rings, the respective pairs having members on opposite sides of the respective field coils, a circle of poles extending from each pole ring of each coil, the poles of the circles associated with each coil interdigitating between the respective coil and the drum, whereby circles of inner and outer pole faces of alternating polarities are established respectively at magnetic gaps within and without the drum, said field coils being excited to produce the same polarity in circles of poles extending from correspondingly the same sides of said coils.

2. A clutch made according to claim 1 wherein the poles of one polarity extending from the pole ring on one side of one coil and the poles of opposite polarity extending from the pole ring on the opposite side of the other coil are radially oppositely located.

3. An electromagnetic clutch made according to claim 2, wherein certain of the pole rings which are located on the same axial sides of the coils have a common support.

4. An electromagnetic clutch made according to claim 3, wherein said common support is on the driving member, said drum being supported by a disc member on the driven member, and means for introducing coolant within the inner pole rings for centrifugal movement and guidance by said disc member into movable engagement with said magnetic drum.

5. An electromagnetic clutch made according to claim 1, wherein said drum is constituted by an intermediate magnetic portion opposite the pole faces and by non-magnetic conductive end rings located axially beyond said pole faces.

6. An electromagnetic clutch comprising driving and driven members, one of said members comprising a magnetic drum, the other member comprising annular field coils respectively located on the outside and the inside of said drum, pairs of magnetic pole rings, the respective pairs having members on opposite sides of the respective field coils, a circle of poles extending from each pole ring of each coil, the poles of the circles associated with each coil interdigitating between the respective coil and the drum, whereby circles of inner and outer pole faces of alternating polarities are established respectively at magnetic gaps within and without the drum, and means for circulating exciting current in opposite clock directions in said coils.

7. A clutch made according to claim 6, wherein the poles of one polarity extending from the pole ring on one side of one coil and the poles of opposite polarity extending from the pole ring on the opposite side of the other coil are radially oppositely located.

8. An electromagnetic clutch comprising driving and driven power transmitting members, one of said members carrying a magnetic inductor drum, the other member carrying first and second annular field coils located respectively inside and outside of the drum, magnetic pole supporting means adjacent each of said field coils, circles of poles extending from the respective pole supporting means and located respectively adjacent opposite sides of the drum, said power transmitting members and drum between them forming a coolant compartment, one of said power transmitting members having openings therein communicating with said compartment within the drum and having a groove outside of the compartment, said groove being connected with said openings, said groove also being open radially inward, and stationary coolant delivery means positioned to direct coolant into said groove for movement by centrifugal force into said compartment through said openings and to said magnetic drum, said coolant also escaping by centrifugal force from said drum, said coolant in its centrifugal movements being adapted to move over the pole supporting means within the drum and between the drum and the circle of poles within it.

9. A clutch made according to claim 8, wherein said driving member includes coolant outlet openings located at a diameter greater than that of the drum.

References Cited in the file of this patent

UNITED STATES PATENTS

| | | |
|---|---|---|
| 2,440,551 | Martin | Apr. 27, 1948 |
| 2,479,989 | Winther | Aug. 23, 1949 |
| 2,603,677 | Winther | July 15, 1952 |

FOREIGN PATENTS

| | | |
|---|---|---|
| 232,144 | Germany | Mar. 7, 1911 |